United States Patent
Neubauer et al.

(10) Patent No.: US 8,758,695 B2
(45) Date of Patent: Jun. 24, 2014

(54) TREATMENT SYSTEM FOR GASOLINE ENGINE EXHAUST GAS

(75) Inventors: Torsten Neubauer, Langenhagen (DE); Marcus Hilgendorff, Hannover (DE); Stephan Siemund, Pattensen (DE); Alfred H. Punke, Schwulper (DE); Gerd Grubert, Hannover (DE)

(73) Assignee: BASF SE, Ludwigshafen (DE)

( * ) Notice: Subject to any disclaimer, the term of this patent is extended or adjusted under 35 U.S.C. 154(b) by 543 days.

(21) Appl. No.: 12/826,952

(22) Filed: Jun. 30, 2010

(65) Prior Publication Data

US 2011/0030346 A1    Feb. 10, 2011

Related U.S. Application Data

(60) Provisional application No. 61/231,461, filed on Aug. 5, 2009.

(30) Foreign Application Priority Data

Aug. 5, 2009 (EP) .................................... 09167270

(51) Int. Cl.
*B01D 50/00* (2006.01)

(52) U.S. Cl.
USPC .......................................... 422/180; 422/177

(58) Field of Classification Search
CPC .... F01N 3/035; B01D 53/944; B01D 53/945; B01D 53/9463; B01J 29/44; B01J 29/7415; B01J 29/7615; B01J 37/0242; B01J 37/0244; B01J 37/0246
USPC .................. 422/177, 180, 211–212; 502/304; 55/520–523; 60/274, 297; 520/223, 77, 520/78, 79
See application file for complete search history.

(56) References Cited

U.S. PATENT DOCUMENTS

| | | | |
|---|---|---|---|
| 4,329,162 A | | 5/1982 | Pitcher, Jr. |
| 5,830,421 A | * | 11/1998 | Gardner et al. ............ 423/213.2 |
| 6,703,343 B2 | * | 3/2004 | Park ............................. 502/355 |
| 7,078,004 B2 | | 7/2006 | Voss et al. |
| 7,110,904 B2 | | 9/2006 | Lippa et al. |
| 7,229,597 B2 | | 6/2007 | Patchett et al. |
| 2003/0083194 A1 | * | 5/2003 | Sung ............................. 502/304 |
| 2003/0167756 A1 | * | 9/2003 | Szymkowicz ................. 60/289 |
| 2004/0219077 A1 | | 11/2004 | Voss et al. |
| 2006/0057046 A1 | * | 3/2006 | Punke et al. ............... 423/215.5 |
| 2007/0044454 A1 | * | 3/2007 | Bonadies et al. .............. 60/289 |
| 2007/0137187 A1 | | 6/2007 | Kumar |
| 2008/0066458 A1 | * | 3/2008 | Toyoda et al. ................. 60/299 |
| 2008/0124264 A1 | | 5/2008 | Ikeda et al. |
| 2009/0193796 A1 | * | 8/2009 | Wei et al. ........................ 60/297 |

FOREIGN PATENT DOCUMENTS

| | | |
|---|---|---|
| EP | 2042226 A2 | 4/2009 |
| WO | WO 02/26379 | 4/2002 |

\* cited by examiner

*Primary Examiner* — Tom Duong
(74) *Attorney, Agent, or Firm* — Servilla Whitney LLC

(57) ABSTRACT

The present invention relates to a treatment system for a gasoline engine exhaust gas stream comprising a particulate filter, said particulate filter comprising: a particulate filter substrate, an inlet layer disposed on the exhaust gas inlet surface of the filter substrate, and an outlet layer disposed on the exhaust gas outlet surface of the filter substrate, wherein the inlet layer comprises Rh and/or Pd, and the outlet layer comprises Rh and/or a zeolite.

22 Claims, 1 Drawing Sheet

TREATMENT SYSTEM FOR GASOLINE ENGINE EXHAUST GAS

CROSS REFERENCE TO RELATED APPLICATIONS

This application claims the benefit of U.S. Provisional Application No. 61/231,461, filed on Aug. 5, 2009, the entire content of which is hereby incorporated by reference in its entirety.

TECHNICAL FIELD

The present invention relates to a treatment system for a gasoline engine exhaust stream and to a method for the treatment of gasoline engine exhaust gas, in particular to a treatment system and a method for the treatment of gasoline engine exhaust gas from gasoline direct injection engines.

BACKGROUND

Although gasoline engines were initially operated in ways such that particulates were not formed, gasoline direct injection (GDI) technologies were later introduced which involve conditions of stratified combustion resulting in lean burn conditions and improved fuel efficiency. Such conditions, however, can lead to the generation of particulates. Particulate emissions for direct injection engines are being subject to regulations including the upcoming Euro 5 (September 2009) and 6 (September 2014) standards. Existing aftertreatment systems for gasoline engines are not suitable for achieving the proposed particulate matter standard. In contrast to particulates generated by diesel lean burning engines, the particulates generated by gasoline direct injection engines tend to be finer and in lesser quantities. This is due to the different combustion conditions of a diesel engine as compared to a gasoline engine. For example, gasoline engines run at a higher temperature than diesel engines. Thus exhaust gas from diesel engines display temperatures generally ranging from 250 to 500° C., whereas exhaust gas from gasoline engines usually have a temperature ranging from 800 to 900° C. Also, hydrocarbon components are different in the emissions of gasoline engines as compared to diesel engines.

Thus, due to the different composition and temperature of exhaust gas streams resulting from gasoline engines compared to diesel engines, in particular with respect to the far lower ratios of soot to hydrocarbon, carbon monoxide and nitrous oxide exhaust gas pollutants, respectively, a different treatment concept is necessary both regarding the type and composition of the apparatus involved in exhaust gas treatment such as particle filters, TWC, and $NO_x$-traps, as well as the arrangement of these components in a system adapted for the treatment of such exhaust gas streams. More specifically, while diesel engine exhaust gas streams will typically contain about 0.14 wt.-% of total hydrocarbon, CO and $NO_x$ pollutants (i.e. about 1.2 g/km of hydrocarbons, about 0.3 g/km of CO, and about 0.23 g/km of $NO_x$) for about 0.02-0.07 g/km of soot, gasoline engine exhaust gas typically contains about 1.1 wt.-% of total hydrocarbon, CO and NO pollutants (i.e. about 5.2 g/km of hydrocarbons, about 1.5 g/km of CO, and about 3.4 g/km of $NO_x$) for about 0.0001-0.001 g/km of soot. Although exhaust gas from gasoline direct injection engines typically contain somewhat less hydrocarbon, CO and NO pollutants and slightly more soot (i.e. about 0.001-0.002 g/km), these proportions are still far from resembling diesel exhaust gas compositions. Further differences regarding particle size and particle size distribution of the soot particles in diesel and gasoline engine exhaust gas streams, as well as the different exhaust gas stream temperatures resulting from diesel and gasoline combustion in the respective engine types leads to completely different scenarios, such that diesel engine exhaust gas treatment technologies may not be readily applied to the technical field of gasoline engine exhaust gas treatment.

Besides regulations for the treatment of exhaust gas particles, emission standards for unburned hydrocarbons, carbon monoxide and nitrogen oxide contaminants also continue to become more stringent. In order to meet such standards, catalytic converters containing a three-way conversion (TWC) catalyst are located in the exhaust gas line of internal combustion engines. In particular, said catalyst promotes the oxidation by oxygen in the exhaust gas stream of unburned hydrocarbons and carbon monoxide as well as the reduction of nitrogen oxides to nitrogen.

With respect to treatment of diesel exhaust gases and particulates, the prior art generally provides for an oxidation catalyst upstream of a particulate filter. A clean-up catalyst downstream of an oxidation catalyst and particulate filter combination is provided in U.S. Patent Application No. 2007/0137187. Suitable clean-up catalysts downstream of the filter include a further oxidation catalyst or a TWC catalyst located on a substrate carrier such as a flow-through monolith.

Particulate filters used in diesel systems have been coated with, for example, soot burning catalysts that facilitate passive regeneration of soot. In addition, U.S. Pat. No. 7,229,597 provides a catalyzed selective catalytic reduction (SCR) filter downstream of an oxidation catalyst for simultaneous treatment of nitrogen oxides ($NO_x$), particulate matter, and hydrocarbons. Further, U.S. Patent Application No. 2004/0219077 discloses a catalyzed filter in communication with a diesel engine exhaust. Placement of catalysts on soot filters, however, leads to gradual loss of effectiveness due to deleterious components of the diesel exhaust stream. A sufficient loading of catalyst is needed to achieve treatment goals, but this should be balanced with the need to provide acceptable back pressure in the system.

In addition to these, EP 2 042 226 A discloses a particulate filter for engines with a primarily stoichiometric regimen regarding the air:fuel ratio of the combustion mixture. In particular, said document teaches a layered catalyst design, wherein a layer containing Rh directly covers a layer containing Pd, and only the Rh-containing layer further comprises an oxygen-storage component (OSC).

It is therefore the object of the present invention to provide a treatment system for a gasoline engine exhaust stream as well as a method for the treatment of gasoline engine exhaust gas, in particular regarding the treatment of gasoline engine exhaust gas from gasoline direct injection engines.

SUMMARY

Provided are exhaust systems and components suitable for use in conjunction with gasoline engines, in particular those with direct injection technology, to capture particulates in addition to reducing gaseous emission such as hydrocarbons, nitrogen oxides, and carbon monoxides. Current aftertreatment systems for such engines do not have particulate filters.

In particular, the object of the present invention is achieved by a treatment system for a gasoline engine exhaust gas stream comprising a particulate filter, said particulate filter comprising:

a particulate filter substrate, an inlet layer disposed on the exhaust gas inlet surface of the filter substrate, and an outlet layer disposed on the exhaust gas outlet surface of the filter substrate,
wherein the inlet layer comprises Rh and/or Pd, and the outlet layer comprises Rh and/or a zeolite.

Other aspects include emission treatment components located upstream and/or downstream of a particulate filter for treatment of gasoline engine exhaust gas streams comprising hydrocarbons, carbon monoxide, and nitrogen oxides, the emission treatment system further comprising a three-way conversion catalyst and/or an $NO_x$-trap.

Still further aspects include methods of treating a gas comprising hydrocarbons, carbon monoxide, nitrogen oxides, and particulates, the method comprising: locating an emissions treatment system downstream of a gasoline engine, preferably a direct injection gasoline engine; providing a three-way conversion (TWC) catalyst and a particulate trap in the emissions treatment system; and contacting exhaust gas from the engine with the TWC catalyst and the particulate trap.

Accordingly, the present invention also provides a method for the treatment of gasoline engine exhaust gas comprising:
(i) providing a treatment system according to the present invention, and
(ii) conducting a gasoline engine exhaust gas stream through the treatment system.

Further embodiments of the present invention are set forth in the claims.

DETAILED DESCRIPTION

Figure 1:
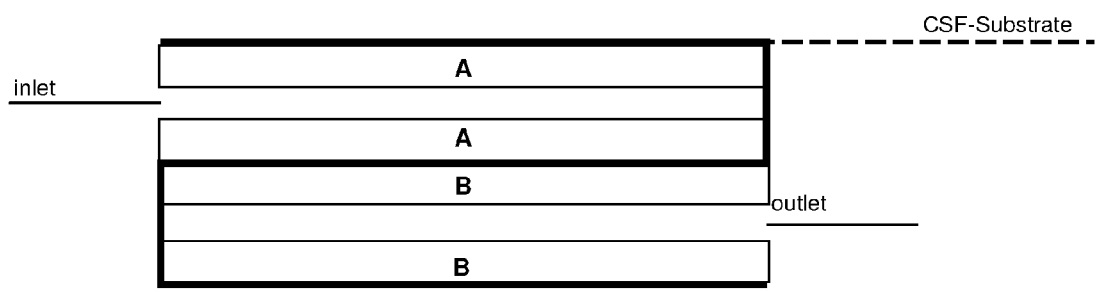
FIGS. 1 and 2 respectively display a schematic cross-section detail of a preferred wall flow particulate filter of the present invention, wherein "inlet" designates a channel of the wall flow filter through which the exhaust gas stream enters the particulate filter, "outlet" designates a channel of the wall flow filter through which the exhaust gas stream exits the particulate filter, "CSF-Substrate" designates the particle filter substrate, "A" designates the inlet layer, and "B" designates the outlet layer.

According to the present invention, a treatment system is provided comprising a particulate filter which is specially adapted to the treatment of gasoline engine exhaust gas streams, in particular those originating from direct injection gasoline engines. More specifically, the particulate filter comprises a particulate filter substrate, an inlet layer disposed on the one surface of the filter substrate which, when applied to the treatment of an exhaust gas is the first to be contacted by the incoming gas stream, and an outlet layer disposed on the one surface of the filter substrate which is the last to be contacted by the exhaust gas, after the gas stream has traversed the filter substrate.

In principle, any filter substrate may be used in the present invention, provided that it allows for the effective filtering of particulate matter contained in gasoline engine exhaust gas streams. Preferably, a particulate trap is used as the filter substrate, wherein, according to the present invention, reference to a particulate trap means a filter so sized and configured to trap particulates generated by the combustion reactions in the gasoline engine, preferably in gasoline engines with direct injection technologies. Trapping of particulates can occur, for example, by use of a flow-through substrate having an internal tortuous path such that a change in direction of flow of the particulates causes them to drop out of the exhaust stream, by use of a substrate, such as a corrugated metal carrier, or by other methods known to those skilled in the art.

According to a preferred embodiment, the substrate is a flow-through monolith, preferably a wall flow filter, and more preferably a wall flow filter having a honeycomb structure. Useful wall flow substrates include those having a plurality of fine, substantially parallel gas flow passages extending along the longitudinal axis of the substrate. Preferably, each passage is blocked at one end of the substrate body, with alternate passages blocked at opposite end-faces. U.S. Pat. No. 4,329,162 is incorporated herein by reference with respect to the disclosure of suitable wall flow substrates which may be used according to the present invention.

The particulate filter substrate may be conceived of any material or combination of materials allowing for the filtering of particulate matter contained in gasoline engine exhaust gas without impeding the function of a gasoline engine in fluid communication with the particulate filter. For this purpose, porous materials are preferably used as the substrate material, in particular ceramic-like materials such as cordierite, α-alumina, silicon carbide, aluminum titanate, silicon nitride, zirconia, mullite, spodumene, alumina-silica-magnesia and zirconium silicate, as well as porous refractory metals and oxides thereof. According to the present invention, "refractory metal" refers to one or more metals selected from the group consisting of Ti, Zr, Hf, V, Nb, Ta, Cr, Mo, W, and Re. The particulate filter substrate may also be formed of ceramic fiber composite materials. According to the present invention, the particulate filter substrate is preferably formed from cordierite, silicon carbide, and/or from aluminum titanate. In general, materials are preferred which are able to withstand the high temperatures to which a particulate filter is exposed to when used in the treatment of gasoline engine exhaust gas.

Among the preferred wall flow filter structures which may be employed in the particulate filters according to the present invention, those structures are particularly preferred which display thin walls such that the back pressure and/or pressure drop across the filter may be held to a minimum. Although the preferred thickness of the wall flow filter structure is highly dependent on the type of material used and the porosity thereof, the wall thickness according to the present invention preferably ranges from 10 μm to 1 mm, more preferably from 50 μm to 600 μm, more preferably from 100 μm to 400 μm, and even more preferably from 250 μm to 350 μm.

Regarding the porosity and average pore size of the substrate material used in the particulate filter, any porosity and average pore size may be employed, provided that the particles contained in gasoline engine exhaust gas may be effectively filtered from the gas stream while not causing a back pressure and/or pressure drop which might impede the normal functioning of a gasoline engine which is preferably in fluid communication with the particle filter. This, however, is highly dependent on the filter structure itself such as the wall thickness in preferred wall flow filter substrates. Nevertheless, according to the present invention, particulate filter substrate materials having a porosity ranging from 20% to 80% are preferred, wherein porosities ranging from 25% to 75% are particularly preferred. Even more preferably, the filter substrate materials according to the present invention display porosities ranging from 35% to 65%, even more preferably from 40% to 60%, and even more preferably from 45% to 55%.

Within the meaning of the present invention, the porosity of a given material is defined as the ratio of the volume of the void space to the total or bulk volume of the material itself. Preferably, porosity within the meaning of the present invention refers to the effective or open porosity of the given material as the fraction of the total volume in which fluid flow is effectively taking place, and therefore excludes dead-end pores or non-connected cavities.

Regarding the average pore size of the porous materials comprised in the particulate filter substrate according to the present invention, said materials may display any conceivable average pore size and pore size distribution, provided that the particles contained in gasoline engine exhaust gas may be effectively filtered from the gas stream while not causing a back pressure and/or pressure drop which might hinder the normal functioning of a gasoline engine which is preferably in fluid communication with the particle filter. Preferably, materials displaying an average pore size of 2 μm or more are employed, wherein more preferably, the average pore size ranges from 5 to 30 μm, even more preferably from 10 to 20 μm.

Regarding the preferred honeycomb wall flow filter substrates, said filter structures may generally display any density of cells, wherein "density of cells" or "cell density" according to the present invention refers to the number of closed cells found in a cross-section surface of the filter perpendicular to the filter axis. The cells can have any conceivable cross section geometry, wherein rectangular, square, circular, oval, triangular, hexagonal geometries, and combinations of two or more of said geometries are preferred. Preferably, wall flow filter substrates displaying a cell density of from 10 to 200 cells per $cm^2$ are employed, more preferably 20 to 100 cells per $cm^2$, more preferably from 30 to 70 cells per $cm^2$, and even more preferably from 40 to 55 cells per $cm^2$.

When substrates with these porosities and these mean pore sizes are coated with the techniques described below, adequate levels of catalyst compositions can be loaded onto the substrates to achieve excellent hydrocarbon, CO, and/or $NO_x$ conversion efficiencies. In particular, these substrates are able to retain adequate exhaust flow characteristics, i.e., acceptable back pressures, despite the catalyst loading.

Figure 2:
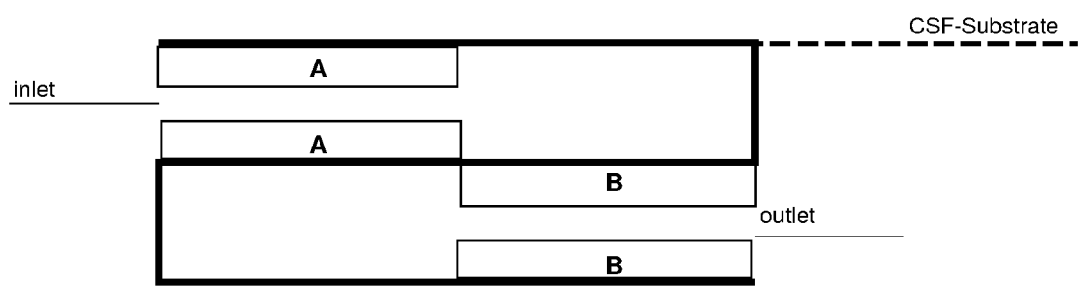

In particular, according to the present invention, the particulate filter comprised in the treatment system contains an inlet layer disposed on the exhaust gas inlet surface of the filter substrate. As described in the foregoing, "inlet layer" according to the present invention designates a layer which is disposed on the one surface of the filter substrate which, when applied to the treatment of an exhaust gas, is the first to be contacted by the incoming gas stream. For example, as displayed in FIGS. 1 and 2 which show a cross-section detail of a preferred wall flow particulate filter according to the present invention, the inlet layer A is disposed on the walls of the channels through which the gasoline engine exhaust gas enters said filter during the treatment process.

In addition to said inlet layer, the particulate filter provided in the treatment system according to the present invention further comprises an outlet layer, wherein the term "outlet layer" designates a layer which is disposed on the surface of the filter substrate which is the last to be contacted by the exhaust gas, after the gas stream has traversed the filter substrate during treatment thereof. Thus, as displayed in FIGS. 1 and 2 which show a cross-section detail of a preferred wall flow particulate filter according to the present invention, the outlet layer B is disposed on the walls of the channels through which the gasoline engine exhaust gas exits said filter during the treatment process.

According to the present invention, any conceivable type of layer may be used in the particulate filter, wherein preferably washcoat layers are used.

In principle, the inlet and outlet layer may be disposed onto the particulate filter in any conceivable manner. In particular, the layers may be applied such, that either the entire inlet and/or outlet surface of the particulate filter is covered by the layer in question, or only a portion thereof. Within the meaning of the present invention, "inlet surface" is to be understood as the one surface of the filter substrate which is the first to be contacted by an incoming gas stream, and "outlet surface" is to be understood as the surface of the filter substrate which is the last to be contacted by the exhaust gas, after the gas stream has traversed the filter substrate during treatment thereof. In this respect, it is conceivable according to the present invention, that only a portion of the inlet surface be covered by the inlet layer when the outlet surface is completely covered by the outlet layer, and that, vice versa, only a portion of the outlet surface of the filter substrate is covered by the outlet layer when the inlet surface is completely covered by the inlet layer. Preferably, however, the inlet and outlet surfaces are either entirely covered or only partly covered by the respective layers as displayed by way of example in FIGS. 1 and 2, respectively, with respect to a preferred wall flow filter substrate.

In case an inlet or outlet surface of the filter is only partly covered by, the portion of the surface which is covered preferably ranges from 10 to 90%, more preferably from 20 to 80%, more preferably from 30 to 70%, more preferably from 40 to 60%, and even more preferably from 45 to 55%. According to embodiments of the present invention wherein only a portion of the inlet and/or the outlet surface of the particulate filter is covered, it is preferred that the covered portion is located on that portion of the inlet and outlet surfaces which is the first to contact the incoming gas stream or the last to contact the gas stream having traversed the filter substrate, respectively. According to a particularly preferred embodiment of the present invention, the sum of the inlet surface portion covered by the inlet layer and the outlet surface portion covered by the outlet layer amounts to a percentage ranging from 50 to 150%, preferably from 60 to 140%, more preferably from 70 to 130%, more preferably from 80 to 120%, more preferably from 90 to 110%, more preferably from 95 to 105%, more preferably from 98 to 102%, more preferably from 99 to 101%, and even more preferably from 90.5 to 100.5%. By way of example, FIG. 2 displays said particularly preferred embodiment for a preferred wall flow filter substrate wherein 50% of the inlet and outlet layer surfaces are respectively covered by the inlet and outlet layers, and the portion of the inlet and outlet surface respectively covered represents the first 50% of the inlet surface to be contacted by the incoming gas stream, and the last 50% of the outlet surface to be contacted by the gas stream exiting the filter substrate, respectively.

Thus, regarding embodiments of the present invention wherein a wall flow filter is used as the filter substrate, those are particularly preferred which comprise an inlet end, an outlet end, a substrate axial length extending between the inlet end and the outlet end, and a plurality of passages defined by internal walls of the wall flow substrate, wherein the plurality of passages comprise inlet passages having an open inlet end and a closed outlet end, and outlet passages having a closed inlet end and an open outlet end, wherein the internal walls of the inlet passages comprise a first inlet coating that extends from the inlet end to a first inlet coating end, thereby defining a first inlet coating length, wherein the first inlet coating length is x % of the substrate axial length, wherein the internal walls of the outlet passages comprise a first outlet coating that extends from the outlet end to a outlet coating end, thereby defining a first outlet coating length, wherein the first outlet coating length is 100−x % of the substrate axial length, wherein 0<x<100.

In particularly preferred embodiments, x ranges from 25 to 75%, preferably from 35 to 65%, and more preferably from 45 to 55%.

Furthermore, it has surprisingly been found that the use of specific compositions of inlet and outlet layers according to the present invention leads to particulate filters which may effectively be used in the treatment of gasoline engine exhaust gas, in particular in the treatment of exhaust gas from direct injection gasoline engines. In this respect, it has unexpectedly been found that specific combinations of compositions for inlet and outlet layers are particularly well suited for the treatment of gasoline engine exhaust gas streams.

More specifically, combinations of inlet and outlet layer compositions according to the present invention concern inlet layers comprising Rh, Pd, or both Rh and Pd in combination with outlet layer compositions comprising Rh, a zeolite, or both Rh and a Zeolite.

Thus, the present invention relates to a treatment system for a gasoline engine exhaust gas stream comprising a particulate filter, said particulate filter comprising:
a particulate filter substrate,
an inlet layer disposed on the exhaust gas inlet surface of the filter substrate, and
an outlet layer disposed on the exhaust gas outlet surface of the filter substrate,
wherein the inlet layer comprises Rh and/or Pd, and the outlet layer comprises Rh and/or a zeolite.

According to a preferred embodiment of the present invention, the inlet layer of the particulate filter comprises Pd, and the outlet layer comprises Rh.

Embodiments according to the present invention are further preferred, wherein inlet layer comprises Rh and Pd, and the outlet layer further comprises Pd. Even more preferred are embodiments wherein inlet and outlet layers both comprise Rh and Pd.

Furthermore preferred are embodiments of the present invention, wherein the particulate filter contains an inlet layer which comprises either Rh or Pd, and the outlet layer comprises a zeolite.

Furthermore, according to a particularly preferred embodiment of the present invention, both the inlet and the outlet layers of the particulate filter comprise Rh.

According to the present invention, the inlet and/or the outlet layers preferably further comprise Pt. Particularly preferred are embodiments, wherein the inlet and/or the outlet layers further comprise Pt in addition to a zeolite.

Zeolites are advantageously used in the present invention in order to adsorb hydrocarbons during the warm up period of gasoline engine exhaust gas treatment, when the treatment system has not yet attained the necessary temperature for full operation. In principle, one or more zeolites may be comprised in the inlet layer and/or in the outlet layer of the particulate filter, wherein one or more zeolites are preferably comprised in the outlet layer. According to particularly preferred embodiments of the present invention, the layer comprising the one or more zeolites further comprises Pt for oxidation of the adsorbed hydrocarbon at higher temperatures.

Generally, any conceivable zeolite may be used in the present invention, wherein preferably a zeolite is used which is selected from the group consisting of faujasite, chabazite, clinoptilolite, mordenite, silicalite, zeolite X, zeolite Y, ultrastable zeolite Y, ZSM-5 zeolite, ZSM-12 zeolite, SSZ-3 zeolite, SAPO 5 zeolite, offretite, beta zeolite, and mixtures thereof. In particularly preferred embodiments, the zeolite is selected from the group consisting of ZSM zeolites, beta zeolite, zeolite Y, and mixtures thereof.

The zeolites used in the present invention may have any conceivable Si:Al ratio, provided that effective treatment of gasoline engine exhaust gas may be achieved, in particular at the high temperatures involved in gasoline engine exhaust gas treatment. Preferably, the zeolites have an Si:Al ratio ranging from 25 to 1000, more preferably from 50 to 500, and even more preferably from 100 to 250. Alternatively, Si:Al ratios ranging from 25 to 300 are preferred, even more preferably from 35 to 180.

In general, the inlet and outlet layers may comprise a support material, preferably a metal oxide as a support for the further components contained therein, in particular for the transition metals Rh and/or Pd. However, in embodiments wherein the outlet layer comprises a zeolite, said layer preferably does not further comprise a support material, in particular when said layer does not comprise a platinum group metal. Within the meaning of the present invention, "platinum group metal" refers to a metal or combinations of two or more metals selected from the group consisting of ruthenium, rhodium, palladium, osmium, iridium, and platinum.

Reference to a "support" in a catalyst layer refers to a material that receives components such as precious metals, in particular platinum group metals, stabilizers, promoters (preferably transition metals), binders, and the like through association, dispersion, impregnation, or other suitable methods. Reference to "impregnated" means that the respective components are disposed onto the support material, in particular into the pores of a support material. In detailed embodiments, impregnation is achieved by incipient wetness, where a volume of a solution containing one or more of the components is approximately equal to the pore volume of the support body. Incipient wetness impregnation generally leads to a substantially uniform distribution of the solution throughout the pore system of the support. Reference to "intimate contact" includes having an effective amount of components in such contact on the same support, in direct contact, and/or in substantial proximity.

As a support material, any conceivable material may be used provided that said material may effectively support at least the function of at least one transition metal which may be contained in either the inlet or the outlet layer of the particulate filter according to the present invention. According to the present invention, metal oxides are preferably used as the support material, more preferably those metal oxides which are selected from the group consisting of alumina, zirconia, zirconia-alumina, baria-alumina, lanthana-alumina, lanthana-zirconia-alumina, and mixtures thereof. Among said preferred supporting materials, lanthana alumina and/or zirconia-alumina are particularly preferred.

Among the types of alumina which may be used as supporting material according to the present invention, both alone or in combination with other metal oxides, gamma alumina is preferred. According to particularly preferred embodiments of the present invention, gamma alumina is used which has been doped with a refractory metal and/or a rare-earth metal, more preferably with lanthanum and/or zirconium.

According to a preferred embodiment of the present invention, lanthana-alumina is preferably used as supporting material for Pd, and zirconia-alumina is preferably used as supporting material for Rh. More preferably, when Pd is supported on lanthana-alumina, said supporting material contains from 2 to 10 wt.-% of La, even more preferably 3 to 6 wt.-% of La, and even more preferably from 3.5 to 4.5 wt.-% of La. Furthermore, when Rh is supported on zirconia-alumina, said supporting material preferably contains from 5 to 35 wt.-% of Zr, more preferably from 10 to 30 wt.-% of Zr, and even more preferably from 15 to 25 wt.-% of Zr.

In preferred embodiments of the present invention, the inlet and/or the outlet layer of the particulate filter comprises an oxygen storage component (OSC). Within the meaning of the present invention, "oxygen storage component" (OSC) refers to an entity that has multi-valence states and can actively react with oxidants such as oxygen or nitrous oxides under oxidative conditions, or reacts with reductants such as carbon monoxide (CO) or hydrogen under reduction conditions. According to the present invention, the OSC is preferably selected from the group consisting of zirconia, ceria, baria, lanthana, praseodymia, neodymia, and mixtures thereof, more preferably from the group consisting of ceria-zirconia-, ceria-zirconia-lanthana-, lanthana-zirconia-, baria-lanthana-, and baria-lanthana-neodymia-mixtures. In particularly preferred embodiments, the oxygen storage component comprised in the inlet and/or outlet layer is ceria and/or zirconia, more preferably a ceria-zirconia composite.

According to particularly preferred embodiments, wherein the inlet layer comprises a ceria-zirconia composite as an OSC, said composite preferably contains from 20 to 70 wt.-% ceria, more preferably from 30 to 60 wt.-%, more preferably from 35 to 55 wt.-%, and even more preferably from 40 to 50 wt.-%.

Furthermore, according to particularly preferred embodiments wherein the outlet layer comprises a ceria-zirconia composite as an OSC, said composite preferably contains from 2 to 20 wt.-% ceria, more preferably from 5 to 15 wt.-%, even more preferably from 8 to 12 wt.-%.

In addition to or instead of an OSC, the inlet and/or the outlet layer may comprise an $NO_x$-trap component, said $NO_x$-trap component preferably being selected from the group consisting of alkali metal oxides, alkaline earth metal oxides, rare-earth metal oxides, and mixtures thereof, more preferably from the group consisting of oxides of potassium, sodium, lithium, cesium, calcium, strontium, barium, cerium, lanthanum, praseodymium, neodymium, and mixtures thereof. In particularly preferred embodiments, the $NO_x$-trap component is barium oxide and/or strontium oxide, more preferably barium oxide.

According to preferred embodiments of the present invention, the treatment system for gasoline engine exhaust gas further comprises a TWC catalyst. In principle, any TWC catalyst may be employed in the treatment system according to the present invention, provided that effective treatment of gasoline engine exhaust gas may be realized. Preferably, TWC catalysts are employed which comprise Rh and/or Pd, more preferably those comprising Pd.

In the treatment system of the present invention, the TWC catalyst and the particulate filter are in fluid communication, wherein, with respect to the direction in which a gasoline engine exhaust gas stream flows through the system for treatment thereof, the TWC catalyst may be located either upstream or downstream of the particulate filter, the positioning of the TWC catalyst upstream of the particulate filter being preferred.

In preferred embodiments of the present invention, the TWC catalyst comprises a metal oxide support material, said support material preferably being selected from the group consisting of alumina, zirconia, zirconia-alumina, baria-alumina, lanthana-alumina, lanthana-zirconia-alumina, and mixtures thereof. In particularly preferred embodiments, the metal oxide support material is gamma-alumina.

Preferably, the support material is doped with a rare-earth element in an amount preferably ranging from 0.01 to 30 wt.-%, more preferably from 0.05 to 15 wt.-%, even more preferably from 0.1 to 10 wt.-%. In particular, the rare-earth element is preferably selected from the group consisting of cerium, lanthanum, praseodymium, neodymium, and mixtures thereof, wherein the rare-earth element is preferably cerium and/or lanthanum, more preferably cerium.

According to a particularly preferred embodiment of the present invention, the metal oxide support material is gamma-alumina which is preferably doped with a refractory metal and/or a rare-earth metal, more preferably with lanthanum and/or zirconium.

In addition to or instead of said support material, the TWC catalyst according to the present invention preferably comprises an OSC, said OSC preferably being selected from the group consisting of zirconia, ceria, baria, lanthana, praseodymia, neodymia, and mixtures thereof, more preferably from the group consisting of ceria-zirconia-, ceria-zirconia-lanthana-, lanthana-zirconia-, baria-lanthana-, and baria-lanthana-neodymia-mixtures. In particularly preferred embodiments, the OSC is ceria and/or zirconia, preferably ceria.

According to the present invention, the treatment system may further comprise, in addition to or instead of a TWC catalyst, an $NO_x$-trap. WO 2008/067375 is incorporated herein by reference with respect to the disclosure of suitable $NO_x$-traps which may be used according to the present invention.

In the treatment system of the present invention, it is however preferred that, alternatively, either a TWC catalyst or an $NO_x$-trap is used in addition to the particulate filter. In principle, in preferred embodiments of the inventive treatment system comprising an $NO_x$-trap, any $NO_x$-trap may be employed, provided that effective treatment of gasoline engine exhaust gas may be realized.

In the preferred treatment systems of the present invention, the $NO_x$-trap and the particulate filter are in fluid communication, wherein, with respect to the direction in which a gasoline engine exhaust gas stream flows through the system for treatment thereof, the $NO_x$-trap may be located either upstream or downstream of the particulate filter, the positioning of the $NO_x$-trap upstream of the particulate filter being preferred.

According to a preferred embodiment of the present invention, the $NO_x$-trap comprises a compound selected from the group consisting of alkali metal-, alkaline earth metal-, rare-earth metal oxides, and mixtures thereof, said compound preferably being selected from the group consisting of oxides of potassium, sodium, lithium, cesium, calcium, strontium, barium, cerium, lanthanum, praseodymium, neodymium, and mixtures thereof. In particularly preferred embodiments, the $NO_x$-trap comprises barium oxide and/or strontium oxide, more preferably barium oxide.

In particularly preferred treatment systems of the present invention, the $NO_x$-trap further comprises Pd, preferably Pd, Pt, and Rh.

According to particularly preferred embodiments of the present invention, the function of the TWC catalyst and/or the $NO_x$-trap is adapted to the function of the particulate filter. Thus, it has surprisingly been found that the specific processes for the treatment of gasoline engine exhaust gas may be advantageously divided among the particulate filter and the TWC catalyst and/or the $NO_x$-trap. More specifically, it has quite unexpectedly been found that when the particulate trap comprises Rh, the $NO_x$-reduction process for the treatment of gasoline engine exhaust gas primarily occurs in the particulate filter rather than on the TWC catalyst and/or on the $NO_x$-trap. This has the considerable advantage that the volume of the TWC catalyst may be reduced, thus leading to treatment systems for gasoline engine exhaust gas which are highly cost efficient since the total amount of expensive platinum group metals used therein, and in particular the total amount of Rh, Pd, and Pt as far as these metals are present in particular embodiments of the present invention, may be reduced.

Thus, according to a particularly preferred embodiment of the present invention, the particulate filter comprises Rh, more preferably in both the inlet and outlet layers of the particulate filter. Preferably, according to said particularly preferred embodiment, the particulate filter comprises substantially no Pd.

Furthermore, it has unexpectedly been found that when the particulate filter comprises Rh, it is advantageous that the TWC catalyst and/or the $NO_x$-trap comprise Pd. In particular, since the total loading of Pd in a treatment system for gasoline exhaust gas according to the present invention is preferably greater than the total loading of Rh, it is advantageous that the TWC catalyst and/or the $NO_x$-trap comprises Pd since better dispersion of Pd may be achieved therein, respectively, compared to the particulate filter. Thus, in preferred embodiments of the present invention wherein the inlet and/or the outlet layer of the particulate filter is a washcoat layer, the total volume of said layers is usually smaller that the volume available for the dispersion of Pd and eventually further platinum group metals in the TWC catalyst and/or the $NO_x$-trap. As a result, a greater efficiency is achieved when the particulate filter comprises Rh and the TWC catalyst and/or the $NO_x$-trap of the treatment system comprises Pd. Preferably, the treatment system comprises a TWC catalyst comprising Pd.

Accordingly, in a particularly preferred embodiment of the present invention, the particulate filter comprises Rh and a TWC catalyst and/or an $NO_x$-trap comprised in the treatment system comprises Pd, wherein the treatment system preferably comprises a TWC catalyst comprising Pd.

The gasoline engine exhaust gas treatment system may further comprise a gasoline engine, wherein the exhaust gas exit of said gasoline engine is in fluid communication with the particulate filter. Preferably, the gasoline engine is a gasoline direct injection engine.

According to a preferred embodiment, the gasoline engine exhaust treatment system comprising a gasoline engine further comprises an exhaust gas conduit in communication with the exhaust gas exit of the gasoline engine, wherein the particulate filter is disposed in said exhaust gas conduit. Preferably, a TWC catalyst and/or an $NO_x$-trap is also disposed in the exhaust gas conduit. According to particularly preferred embodiments, the TWC catalyst and/or $NO_x$-trap are respectively located upstream of the particulate filter in the exhaust gas conduit with respect to the direction of exhaust gas flow.

Thus, the present invention also relates to a treatment system for a gasoline engine exhaust gas stream, wherein said system further comprises:
- a gasoline engine, preferably a gasoline direct injection engine, and an exhaust gas conduit in communication with the engine,
- wherein the particulate filter substrate and the optional TWC catalyst and/or $NO_x$-trap are disposed within the exhaust gas conduit.

In addition to these, the treatment system according to the present invention may comprise any further components which may be advantageously be employed in the treatment of gasoline engine exhaust gas such as one or more gas sensors and/or an on-board diagnostic (OBD) system.

According to a further aspect of the present invention, a method for the treatment of gasoline engine exhaust gas is provided using the treatment system for gasoline engine exhaust gas as described in the foregoing. In particular, a method is provided for the treatment of gasoline engine exhaust gas displaying specific amounts of hydrocarbons (HC), CO, $NO_x$, and soot as exhaust pollutants, in particular with respect to the ratios of HC, CO, $NO_x$, and soot produced by the combustion of hydrocarbons in gasoline engines, preferably with respect to the ratios produced by gasoline direct injection engines.

Thus, the present invention also relates to a method for the treatment of gasoline engine exhaust gas comprising:
(i) providing a treatment system according to any one of the embodiments, and
(ii) conducting a gasoline engine exhaust gas stream through the treatment system.

In general, the method according to the present invention may be applied to any gasoline engine exhaust gas. Preferably, a treatment method is provided according to the present invention which uses exhaust gas from gasoline direct injection engines. Regarding the composition of gasoline engine exhaust gas utilized in the treatment method of the present invention, the weight ratios of the HC, CO, $NO_x$, and soot pollutants, i.e. in terms of the HC:CO:$NO_x$:soot weight ratios, preferably range from (2.5-7.0):(0.5-3.0):(1.0-4.7):(0.00005-0.01), more preferably from (3.0-6.8):(0.7-2.5):(2.0-4.2):(0.0001-0.007), more preferably from (3.5-6.5):(0.8-2.0):(2.5-4.0):(0.0003-0.005), more preferably from (4.0-6.0):(1.0-1.9):(3.1-3.7):(0.0005-0.003), and even more preferably from (4.5-5.5):(1.2-1.7):(3.2-3.6):(0.001-0.0025).

According to the method of the present invention, the temperature at which the gasoline engine exhaust gas stream is conducted through the treatment system, and in particular the temperature of the exhaust gas stream immediately before it comes into contact with the particulate filter usually ranges from 300 to 1100° C. Preferably, the temperature of the exhaust gas stream immediately before it comes into contact with the particulate filter ranges from 450 to 1000° C., more preferably from 550 to 950° C., more preferably from 650 to 900° C., and even more preferably from 750 to 850° C. Alternatively, the temperature of the exhaust gas stream immediately before it comes into contact with the particulate filter preferably ranges from 500 to 900° C., more preferably from 550 to 800° C., and even more preferably from 600 to 750° C.

In general, any conceivable methods may be employed for the production of the treatment system according to the present invention. Typically, to coat the particulate filter substrate such as the preferred honeycomb wall flow substrates with the composition of the inlet and outlet layers, the substrates are immersed vertically in a portion of a slurry comprising the desired components, such that the top of the substrate is located just above the surface of the slurry. In this manner slurry contacts the inlet face of each honeycomb wall, but is prevented from contacting the outlet face of each wall. The sample is typically left in the slurry for about 30 seconds. The substrate is then removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300 to 450° C. and up to 550° C.). After calcining, the catalyst loading can determined be through calculation of the coated and uncoated weights of the substrate. As will be apparent to those of skill in the art, the catalyst, loading can be modified by altering the solids content of the coating slurry. Alternatively, repeated immersions of the substrate in the coating slurry can be conducted, followed by removal of the excess slurry as described above.

With reference to a substrate, a useful substrate may be metallic in nature and be composed of one or more metals or metal alloys. The metallic carriers may be employed in various shapes such as corrugated sheet or monolithic form. Specific metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt.-% of the alloy, e.g., 10-25 wt.-% of chromium, 3-8 wt.-% of aluminum and up to 20 wt.-% of nickel. The alloys may also contain small or trace amounts of one or more other metals such as manganese, copper, vanadium, titanium and the like. The surface of the metal carriers may be oxidized at high temperatures, e.g., 1000° C. and higher, to improve the resistance to corrosion of the alloys by forming an oxide layer on the surfaces of the carriers. Such high temperature-induced oxidation may enhance adherence of a catalytic material to the carrier.

The catalyst composites of the present invention may be formed in a single layer or multiple layers. In some instances, it may be suitable to prepare one slurry of catalytic material and use this slurry to form multiple layers on the carrier. The composites can be readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated.

The catalyst composite can be readily prepared in layers on a carrier. For a first layer of a specific washcoat, finely divided particles of a high surface area metal oxide such as gamma alumina are slurried in an appropriate vehicle, e.g., water. To incorporate components such as precious- and/or platinum group metals (e.g., palladium, rhodium, platinum, and/or combinations of the same), stabilizers and/or promoters, such components may be incorporated in the slurry as a mixture of water soluble or water-dispersible compounds or complexes. Typically, when palladium is included in the washcoat, the palladium component is utilized in the form of a compound or complex to achieve dispersion of the component on the metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. This applies accordingly to all platinum group elements used alone or in combination with one another according to the present invention. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate.

A suitable method of preparing any layer of the layered catalyst composite of the invention is to prepare a mixture of a solution of a desired precious and/or platinum group compound (e.g., palladium compound) and at least one support, such as a finely divided, high surface area, metal oxide support, e.g., gamma alumina, which is sufficiently dry to absorb substantially all of the solution to form a wet solid which later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry.

In one embodiment, the slurry is thereafter comminuted to result in substantially all of the solids having average particle sizes of about 20 microns or less, preferably from about 0.1 to 15 microns, in an average diameter. The comminution may be accomplished in a ball mill or other similar equipment, and the solids content of the slurry may be in the range of about 20 to 60 wt.-%, more particularly about 30 to 40 wt.-%.

Additional layers, i.e., the second and third layers may be prepared and deposited upon the first layer in the same manner as described above for deposition of the first layer upon the carrier.

EXAMPLES

Examples of particulate filters according to the present invention were prepared according to the following procedures. In all examples, a cordierite wall flow filter substrate was provided. In the wall flow filter, alternate ends of the substantially parallel gas flow passages extending along the longitudinal axis of the substrate were blocked at either the inlet or the outlet of the monolith, such that inlet channels with an open inlet side and a blocked outlet side, and outlet channels with a blocked inlet side and an open outlet side were respectively formed. In the following examples, washcoat layers formed on the walls of the inlet channels are designated as inlet layers, and washcoat layers formed on the walls of the outlet channels are designated as outlet layers. During operation in a treatment system according to the present invention, the particulate filter is disposed in the gasoline engine exhaust gas stream such that the exhaust gas enters the inlet channels and, after first flowing through the inlet layer, followed by the porous substrate material, and finally the outlet layer, exits the particulate filter via the outlet channels.

Example 1

A catalyzed particulate filter was prepared by applying respective washcoat layers to the inlet and outlet channels of a cordierite wall flow filter substrate. The substrate had a volume of 85.23 in$^3$ (1,396.67 cm$^3$) a cell density of 300 cells per square inch (46.5 cells per cm$^2$) and a wall thickness of approximately 12 mil (0.3 mm). The final catalyzed particulate filter contained Pd and Rh with a total precious metal loading of 15 g/ft$^3$ (529.72 g/m$^3$) and Pd:Rh ratio of 13.5:1.5. Furthermore, the final catalyzed particulate filter had an oxygen storage component (OSC) content of 50 wt.-%, the inlet layer having an OSC content of 63 wt.-%, and the outlet layer having an OSC content of 27%. The washcoat layers were prepared as follows:

Inlet Layer Washcoat

The components present in the inlet coat were gamma alumina stabilized with 4 wt.-% of lanthanum, a ceria-zirconia composite with 45 wt.-% ceria, and barium oxide, at respective concentrations of approximately 30%, 63%, and 6% based on the weight of the inlet washcoat layer in the final calcined catalyzed particulate filter. The total loading of the inlet washcoat layer in the final calcined catalyzed particulate filter was 0.5 g/in$^3$ (0.0305 g/cm$^3$).

To form the inlet coat, a palladium nitrate solution was impregnated by planetary mixer (P-mixer) onto the stabilized gamma alumina to form a wet powder while achieving incipient wetness, wherein the amount of Pd was chosen such, that a final concentration in the particulate filter of 13.5 g/ft$^3$ of Pd was achieved. An aqueous slurry was then formed by mixing all of the above-mentioned components of the inlet layer washcoat with water, wherein barium oxide was provided in the form of a barium acetate solution. The aqueous slurry was then milled to achieve a particle size distribution, wherein 90% of the particles have a particle size of less than 10 μm. The slurry was then coated onto the inlet channels of the wall flow filter substrate using deposition methods known in the art. The coated carrier was then calcined at 500° C. for 1 h.

Outlet Layer Washcoat

The components present in the outlet coat were gamma alumina doped with 20 wt.-% of zirconium, a ceria-zirconia composite with 10 wt-% ceria, zirconium oxide, and barium oxide, at respective concentrations of 66%, 27%, 3%, and 3%, based on the weight of the outlet washcoat layer in the final calcined catalyzed particulate filter. The total loading of the outlet washcoat layer in the final calcined catalyzed particulate filter was 0.5 g/in$^3$ (0.0305 g/cm$^3$).

To form the outlet coat, a rhodium nitrate solution was impregnated by planetary mixer (P-mixer) onto the stabilized alumina to form a wet powder while achieving incipient wetness, wherein the amount of Rh was chosen such, that a final concentration in the particulate filter of 1.5 g/ft$^3$ of Rh was achieved. An aqueous slurry was then formed by mixing all of the above-mentioned components of the outlet layer washcoat with water, wherein barium oxide was provided in the form of a barium acetate solution. The aqueous slurry was then milled to achieve a particle size distribution, wherein 90% of the particles have a particle size of less than 10 μm. The slurry was then coated onto the outlet channels of the wall flow filter substrate using deposition methods known in the art. The coated carrier was then calcined at 550° C. for 1 h, thus affording a catalyzed particulate filter.

Example 2

A catalyzed particulate filter was prepared by applying respective washcoat layers to the inlet and outlet channels of a cordierite wall flow filter substrate. The substrate had a volume of 85.23 in$^3$ (1,396.67 cm$^3$) a cell density of 300 cells per square inch (46.5 cells per cm$^2$) and a wall thickness of approximately 12 mil (0.3 mm). The final catalyzed particulate filter contained Pd with a loading of 13.5 g/ft$^3$ (476.75 g/m$^3$).

The washcoat layers were prepared as follows:

Inlet Layer Washcoat

The components present in the inlet coat were gamma alumina stabilized with 4 wt.-% of lanthanum, a ceria-zirconia composite with 45 wt.-% ceria, and barium oxide, at respective concentrations of approximately 30%, 63%, and 6% based on the weight of the inlet washcoat layer in the final calcined catalyzed particulate filter. The total loading of the inlet washcoat layer in the final calcined catalyzed particulate filter was 0.5 g/in$^3$ (0.0305 g/cm$^3$).

To form the inlet coat, a palladium nitrate solution was impregnated by planetary mixer (P-mixer) onto the stabilized gamma alumina to form a wet powder while achieving incipient wetness, wherein the amount of Pd was chosen such, that a final concentration in the particulate filter of 13.5 g/ft$^3$ of Pd was achieved. An aqueous slurry was then formed by mixing all of the above-mentioned components of the inlet layer washcoat with water, wherein barium oxide was provided in the form of a barium acetate solution. The aqueous slurry was then milled to achieve a particle size distribution, wherein 90% of the particles have a particle size of less than 10 μm. The slurry was then coated onto the inlet channels of the wall flow filter substrate using deposition methods known in the art. The coated carrier was then calcined at 500° C. for 1 h.

Outlet Layer Washcoat

H-Beta zeolite, distilled water and acetic acid are mixed to obtain a slurry with a solid content of 35 wt.-% and a pH in the range of from 3 to 4. The slurry is then milled to obtain an average particle size of 5 μm. Subsequently, the slurry is applied to the outlet layer using deposition methods known in the art to achieve a loading of the outlet washcoat layer in the final calcined catalyzed particulate filter of from 0.2 to 0.5 g/in$^3$ (0.0122 to 0.0305 g/cm$^3$).

Example 3

A catalyzed particulate filter was prepared by applying respective washcoat layers to the inlet and outlet channels of a cordierite wall flow filter substrate. The substrate had a volume of 85.23 in$^3$, (1,396.67 cm$^3$) a cell density of 300 cells per square inch (46.5 cells per cm$^2$) and a wall thickness of approximately 12 mil (0.3 mm). The final catalyzed particulate filter contained Pd and Rh with a total precious metal loading of 15 g/ft$^3$ (529.72 g/m$^3$) and Pd:Rh ratio of 13.5:1.5.

The washcoat layers were prepared as follows:

Inlet Layer Washcoat

The components present in the inlet coat were gamma alumina stabilized with 4 wt.-% of lanthanum, gamma alumina doped with 20 wt.-% of zirconium, a ceria-zirconia composite with 45 wt.-% ceria, and barium oxide, at respective concentrations of approximately 24%, 6%, 63%, and 6% based on the weight of the inlet washcoat layer in the final calcined catalyzed particulate filter. The total loading of the inlet washcoat layer in the final calcined catalyzed particulate filter was 0.5 g/in³ (0.0305 g/cm³).

To form the inlet coat, a palladium nitrate solution was impregnated by planetary mixer (P-mixer) onto the gamma alumina stabilized with lanthanum to form a wet powder while achieving incipient wetness, wherein the amount of Pd was chosen such, that a final concentration in the particulate filter of 13.5 g/ft³ of Pd was achieved. Subsequently, a rhodium nitrate solution was impregnated by planetary mixer (P-mixer) onto the gamma alumina stabilized with zirconium to form a wet powder while achieving incipient wetness, wherein the amount of Rh was chosen such, that a final concentration in the particulate filter of 1.5 g/ft³ of Rh was achieved.

An aqueous slurry was then formed by mixing all of the above-mentioned components of the inlet layer washcoat with water, wherein barium oxide was provided in the form of a barium acetate solution. The aqueous slurry was then milled to achieve a particle size distribution, wherein 90% of the particles have a particle size of less than 10 μm. The slurry was then coated onto the inlet channels of the wall flow filter substrate using deposition methods known in the art. The coated carrier was then calcined at 550° C. for 1 h.

Outlet Layer Washcoat

H-Beta zeolite, distilled water and acetic acid are mixed to obtain a slurry with a solid content of 35 wt.-% and a pH in the range of from 3 to 4. The slurry is then milled to obtain an average particle size of 5 μm. Subsequently, the slurry is applied to the outlet layer using deposition methods known in the art to achieve a loading of the outlet washcoat layer in the final calcined catalyzed particulate filter of from 0.2 to 0.5 g/in³ (0.0122 to 0.0305 g/cm³).

What is claimed:

1. A treatment system for a gasoline engine exhaust gas stream comprising a particulate filter, said particulate filter comprising:
    a particulate filter substrate,
    an inlet layer disposed on the exhaust gas inlet surface of the filter substrate,
    an outlet layer disposed on the exhaust gas outlet surface of the filter substrate, wherein the inlet layer comprises Rh and Pd and the outlet layer comprises Rh, or Rh and a zeolite, and
    wherein said system further comprises a three-way conversion (TWC) catalyst and/or an NOx-trap which is in fluid communication with the particular filter.

2. The treatment system according to claim 1, wherein the outlet layer further comprises Pd.

3. The treatment system according to claim 1, wherein the zeolite is selected from the group consisting of faujasite, chabazite, clinoptilolite, mordenite, silicalite, zeolite X, zeolite Y, ultrastable zeolite Y, ZSM-5 zeolite, ZSM-12 zeolite, SSZ-3 zeolite, SAPO 5 zeolite, offretite, beta zeolite, and mixtures thereof.

4. The treatment system according to claim 1, wherein the inlet layer, the outlet layer, or both independently further comprises a metal oxide support material, said support material preferably being selected from the group consisting of alumina, zirconia, zirconia-alumina, baria-alumina, lanthana-alumina, lanthana-zirconia-alumina, and mixtures thereof.

5. The treatment system according to claim 4, wherein the metal oxide support material comprises gamma-alumina that is doped with a refractory metal, a rare-earth metal, or both.

6. The treatment system according to claim 4, wherein the metal oxide support is doped with lanthanum, zirconium, or both.

7. The treatment system according to claim 1, wherein the inlet layer, the outlet layer, or both independently further comprises an oxygen storage component (OSC) selected from the group consisting of zirconia, ceria, baria, lanthana, praseodymia, neodymia, and mixtures thereof.

8. The treatment system according to claim 7, wherein the OSC comprises a ceria-zirconia composite.

9. The treatment system according to claim 1, wherein the inlet layer, the outlet layer, or both independently further comprises an $NO_x$-trap component selected from the group consisting of alkali metal oxides, alkaline earth metal oxides, rare-earth metal oxides, and mixtures thereof.

10. The treatment system according to claim 9, wherein the $NO_x$-trap component comprises barium oxide, strontium oxide, or both.

11. The treatment system according to claim 1, wherein the particulate filter substrate is a flow-through monolith, preferably a wall-flow filter, wherein the wall-flow filter preferably has a honeycomb structure.

12. The treatment system according to claim 1, wherein the TWC catalyst is located upstream of the particulate filter.

13. The treatment system according to claim 12, wherein the TWC catalyst comprises Rh, Pd, or both; a metal oxide support material being selected from the group consisting of alumina, zirconia, zirconia-alumina, baria-alumina, lanthana-alumina, lanthana-zirconia-alumina, and mixtures thereof; and an OSC, being selected from the group consisting of zirconia, ceria, baria, lanthana, praseodymia, neodymia, and mixtures thereof.

14. The treatment system according to claim 1, wherein the $NO_x$-trap is located upstream of the particulate filter.

15. The treatment system according to claim 14, wherein the $NO_x$-trap comprises a compound selected from the group consisting of alkali metal-, alkaline earth metal-, rare-earth metal oxides, and mixtures thereof.

16. The treatment system according to claim 15, wherein the $NO_x$-trap comprises barium oxide, strontium oxide, or both.

17. The treatment system according to claim 1, said system further comprising:
    a gasoline engine, and
    an exhaust gas conduit in communication with the engine, wherein the particulate filter substrate and the TWC catalyst and/or $NO_x$-trap are disposed within the exhaust gas conduit.

18. The treatment system according to claim 17, wherein the gasoline engine is a gasoline direct injection engine.

19. A method for the treatment of gasoline engine exhaust gas comprising:
    (i) providing a treatment system according to claim 1, and
    (ii) conducting a gasoline engine exhaust gas stream through the treatment system.

20. The method according to claim 19, wherein the exhaust gas stream comprises hydrocarbons (HC), CO, $NO_x$, and soot in an HC:CO:$NO_x$:soot weight ratios of (2.5-7.0):(0.5-3.0):(1.0-4.7):(0.00005-0.01).

21. A treatment system for a gasoline engine exhaust gas stream comprising a particulate filter, said particulate filter comprising:
    a particulate filter substrate,
    an inlet layer disposed on the exhaust gas inlet surface of the filter substrate, and
    an outlet layer disposed on the exhaust gas outlet surface of the filter substrate, wherein the inlet layer comprises Rh, Pd, or both and the outlet layer comprises Rh, Pd, and a zeolite, and wherein said system further comprises a three-way conversion (TWC) catalyst and/or an $NO_x$-trap which is in fluid communication with the particulate filter.

22. A treatment system for a gasoline engine exhaust gas stream comprising a particulate filter, said particulate filter comprising:
   a particulate filter substrate,
   an inlet layer disposed on the exhaust gas inlet surface of the filter substrate, and
   an outlet layer disposed on the exhaust gas outlet surface of the filter substrate, wherein the inlet layer comprises Rh and Pd and the outlet layer comprises Rh, a zeolite, or both, wherein the inlet layer, the outlet layer or both further comprise Pt, and
   wherein said system further comprises a three-way conversion (TWC) catalyst and/or an $NO_x$-trap which is in fluid communication with the particulate filter.

* * * * *